(12) United States Patent
Kawakami et al.

(10) Patent No.: US 7,292,009 B2
(45) Date of Patent: Nov. 6, 2007

(54) HYBRID TYPE WORKING MACHINE

(75) Inventors: Toshiaki Kawakami, Saitama (JP); Tsutomu Inui, Saitama (JP); Tsutomu Wakitani, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 24 days.

(21) Appl. No.: 10/935,220

(22) Filed: Sep. 8, 2004

(65) Prior Publication Data
US 2005/0057226 A1 Mar. 17, 2005

(30) Foreign Application Priority Data
Sep. 17, 2003 (JP) ............................. 2003-324454
Sep. 22, 2003 (JP) ............................. 2003-329804

(51) Int. Cl.
*H02H 7/06* (2006.01)
*H02P 9/00* (2006.01)
*H02P 11/00* (2006.01)
*H02P 9/04* (2006.01)

(52) U.S. Cl. ............................. 322/29; 290/6; 322/44
(58) Field of Classification Search ............... 322/29; 290/6
See application file for complete search history.

(56) References Cited

U.S. PATENT DOCUMENTS

| | | | | |
|---|---|---|---|---|
| 3,499,164 A | * | 3/1970 | Ferre et al. ................. | 290/17 |
| 3,551,685 A | * | 12/1970 | Corry ........................ | 290/14 |
| 3,953,775 A | * | 4/1976 | Friend et al. .............. | 318/147 |
| 4,292,531 A | * | 9/1981 | Williamson ............... | 290/14 |
| 4,305,254 A | * | 12/1981 | Kawakatsu et al. ........ | 60/716 |
| 4,447,737 A | * | 5/1984 | Cronin ....................... | 290/6 |
| 4,547,678 A | * | 10/1985 | Metzner et al. ........... | 290/40 C |
| 4,719,361 A | | 1/1988 | Brubaker ................... | 290/45 |
| 4,879,498 A | * | 11/1989 | Shinohara et al. ......... | 318/254 |

(Continued)

FOREIGN PATENT DOCUMENTS

JP 2001-161104 6/2001

(Continued)

OTHER PUBLICATIONS

GB 1 193 308 A (Licentia) May 28, 1970, Patent Specification, pp. 1-3.

(Continued)

*Primary Examiner*—Julio Gonzalez
*Assistant Examiner*—Pedro J. Cuevas
(74) *Attorney, Agent, or Firm*—Westerman, Hattori, Daniels & Adrian, LLP.

(57) ABSTRACT

Simplifying the controller of hybrid type drive unit. The output of a generator driven by engine is connected directly to a motor 7 through a converter or switching circuit 10 without being charged on any battery. The output of each phase of the generator is inputted to the converter 10. A timing controller 126 controls the conduction phase of a thyristor bridge 101 in the converter 10 so as to adjust the quantity of output power. A synchronous standard for phase control is formed based on output wave of an auxiliary winding 26 of the generator. A voltage detector 124 detects an applied voltage on the motor 7 as a motor rotation speed and the conduction angle is increased or decreased so as to maintain a detected voltage at a target value.

11 Claims, 5 Drawing Sheets

U.S. PATENT DOCUMENTS

| | | | |
|---|---|---|---|
| 5,081,365 A * | 1/1992 | Field et al. .................... | 290/45 |
| 5,206,567 A * | 4/1993 | Sakurai et al. ............... | 318/254 |
| 5,304,912 A * | 4/1994 | Kajiwara et al. ........... | 318/802 |
| 5,323,613 A * | 6/1994 | Akiyama ..................... | 60/608 |
| 5,459,386 A * | 10/1995 | Okachi et al. .............. | 318/727 |
| 5,527,637 A * | 6/1996 | Nakazawa et al. ............ | 429/99 |
| 5,663,631 A * | 9/1997 | Kajiura et al. ................ | 322/29 |
| 5,694,010 A * | 12/1997 | Oomura et al. ............. | 318/254 |
| 5,828,136 A * | 10/1998 | Yang .......................... | 290/4 A |
| 6,048,289 A * | 4/2000 | Hattori et al. ................ | 477/15 |
| 6,051,951 A * | 4/2000 | Arai et al. ................... | 318/700 |
| 6,110,066 A * | 8/2000 | Nedungadi et al. ............ | 475/5 |
| 6,344,721 B2 * | 2/2002 | Seki et al. ................... | 318/254 |
| 6,408,767 B1 * | 6/2002 | Binnard et al. ................ | 108/20 |
| 6,900,618 B2 * | 5/2005 | Maehara ..................... | 322/28 |
| 6,912,142 B2 * | 6/2005 | Keim et al. ................... | 363/89 |
| 7,023,102 B2 * | 4/2006 | Itoh ......................... | 290/40 C |
| 7,071,656 B2 * | 7/2006 | Taniguchi .................... | 322/28 |
| 7,095,132 B2 * | 8/2006 | Kikuchi et al. ............... | 290/52 |
| 7,105,944 B2 * | 9/2006 | Wakitani et al. ........... | 307/10.6 |
| 7,145,262 B2 * | 12/2006 | Kikuchi et al. ............... | 290/44 |
| 7,227,272 B2 * | 6/2007 | Asada et al. ............... | 290/40 A |
| 7,230,785 B2 * | 6/2007 | Itagaki et al. ............ | 360/73.03 |
| 2004/0204803 A1 * | 10/2004 | Matsuda et al. ............... | 701/22 |
| 2006/0290305 A1 * | 12/2006 | Washino et al. ............. | 318/432 |
| 2007/0133239 A1 * | 6/2007 | Tanaka ........................ | 363/65 |

FOREIGN PATENT DOCUMENTS

JP  2001-161114  6/2001

OTHER PUBLICATIONS

GB 949,257 A (Roland Rouxel; Schneider Karl) Feb. 12, 1964, Patent Specification, pp. 1-5.

* cited by examiner

HYBRID TYPE WORKING MACHINE

BACKGROUND OF THE INVENTION

1. Field of the Invention

The present invention relates to a hybrid type working machine that is equipped with an engine and an electric power-driven motor (motor) each of that serves as the power source, and more particularly to a hybrid type working machine that is constructed so that the output of a generator that is driven by the engine may be supplied directly to the motor without the intermediary of a battery.

2. Description of the Related Art

There have in recent years been proposed so-called hybrid type working machines that use both of the engine and motor as the power source in the way that they are used as hybridization. For example, a Japanese official gazette of Japanese Patent Application Laid-Open No. 2001-161114 discloses a car type farming working machine wherein a working machine is mounted to an automotive vehicle for travel, in which to a driving system for the working machine side and that for the generator that has been loaded on the automotive vehicle for travel there is transmitted the power that is delivered from the engine. And, when the load that is applied to the engine from the working machine is small in magnitude, the generator is driven by the surplus power of the engine, and the surplus energy is accumulated in a relevant battery as the electric power. This car type farming working machine is a hybrid type working machine that attaches importance to the efficient use of energy so that the load to the engine may be maintained within a proper range of values; and that the battery may be able to be used as the source of driving the motor.

In a Japanese official gazette of Japanese Patent Application Laid-Open No. 2001-161104, there is disclosed a hybrid type managing machine (working machine) wherein for driving the travel of a managing machine main body and for driving the generator there is used an engine power, whereby the managing machine main body is driven using a motor the power source of that is a battery that has been electrically charged by the generator. This hybrid type managing machine has been improved in operating efficiency with conceiving the easy controllability of a motor enabling simplifying the complex working-machine operation mechanism.

The above-described conventional hybrid type working machine and control unit absolutely require a battery for accumulating a generated output of the generator driven by the engine. Therefore, even a small working machine cannot avoid increase in the size and weight by the same amount as a loaded battery. Particularly because if the output capacity of a generator is small, a fluctuation in power source is likely to occur due to a change in the load, the battery suppresses this fluctuation in power source. Therefore, if no battery is provided, the output is likely to be instable when the fluctuation of load is large.

SUMMARY OF THE INVENTION

An object of the present invention is to provide a hybrid type drive unit capable of driving the motor stably without charging the battery with the output of a generator temporarily.

The present invention has a first characering feature in that it provides a hybrid type drive apparatus having a generator driven by an engine and an output control unit for controlling the quantity of power supplied to a motor using AC power outputted from the generator as power supply source, wherein the output control unit includes an output control means for adjusting the quantity of outputted power by switching on and off each phase output of the generator, a synchronous reference computing means for computing a synchronous standard synchronous with each phase output of the generator based on the output frequency of the generator, a speed detecting means for detecting the rotation speed of the motor, and a computing means for determining a speed target value by compensating for a set target value based on a rotation speed detected by the speed detecting means, wherein the output control unit controls each phase output of the generator based on a conduction angle for controlling the rotation speed detected by the speed detecting means to the speed target value and the synchronous standard.

The present invention has a second charactering feature in that it provides a hybrid type drive apparatus wherein the speed detecting means is a detecting means for an applied voltage representing the rotation speed of the motor and the output control unit decreases the conduction angle when the applied voltage is higher than a voltage instruction value corresponding to the speed target value and increases the conduction angle when lower than the voltage instruction value.

The present invention has a third charactering feature in that it provides a hybrid type drive apparatus further comprising a load detecting means for detecting the load condition of the motor and a means for compensating the conduction angle corresponding to a detected load condition.

The present invention has a fourth charactering feature in that it provides a hybrid type drive apparatus wherein the generator has a main winding for supplying power to the motor and an auxiliary winding provided separately from the main winding as output lines thereof and the synchronous standard computing means computes the synchronous standard based on an output from the auxiliary winding.

The present invention has a fifth charactering feature in that it provides a hybrid type drive apparatus wherein the synchronous standard is used as a control standard for phase control to an output waveform of the main winding where the output is switching controlled in a cycle next after the computation of the synchronous standard.

The present invention has a sixth charactering feature in that it provides a hybrid type drive apparatus which is applied to a working machine driven by the engine and the motor which uses the engine as a drive source.

The present invention has a seventh charactering feature in that it provides a hybrid type drive apparatus wherein the generator has a main winding and an auxiliary winding placed separately from the main winding and the synchronous standard computing means is so constructed to determine a synchronous standard for each cycle of the output cycle of the auxiliary winding, and the switching control is executed based on a conduction angle determined corresponding to the difference so as to eliminate a difference between the output voltage of the output control means and a predetermined target voltage.

The present invention has an eighth characering feature in that it provides a hybrid type drive apparatus wherein said synchronous standard is used for the standard of the switching control about a corresponding AC output wave of the output control means in a cycle just after the synchronous standard is determined.

The present invention has a ninth characering feature in that it provides a hybrid type drive apparatus further comprising a current detecting means for detecting an output load current and a load control means for compensating the conduction angle corresponding to the magnitude of the load current.

The present invention has a tenth charactering feature in that it provides a hybrid type drive apparatus further comprising a drive power source generating means for generating a control power for driving a switching circuit for switching each phase of the generator output with a output of the auxiliary winding.

The present invention has an eleventh charactering feature in that it provides a hybrid type drive apparatus constructed as a battery free hybrid type power source so that the output of the generator which is switching controlled is supplied directly to the motor.

According to the first and the seven feature of the present invention, by changing the conduction angle for the on and off control directly with a synchronous condition to the output of each phase of a generator, the rotation speed of the motor is controlled to a target value. Therefore, the rotation speed of the motor can be controlled stably regardless of a fluctuation in the rotation of the generator. Therefore, the motor can be driven stably even if the output of the generator is not charged in the battery temporarily for compensating the small output of the generator.

According to the second feature of the present invention, the rotation speed of the motor can be controlled under phase control synchronous with the output of each phase of the generator easily based on an applied voltage of the motor.

According to the third feature of the present invention, the output of the generator can be compensated easily corresponding to a fluctuation in motor load.

According to the fourth feature of the present invention, the auxiliary winding is separated from the main winding and the synchronous standard can be determined from the output of the auxiliary winding which is not affected by any load unlike the main winding.

According to the fifth feature of the present invention, the synchronous standard formed based on the output of the auxiliary winding can be used within a cycle after computation immediately. Thus, the phase control can be carried out at a high precision.

According to the sixth feature of the present invention, the output of the engine and motor can be used independently because the motor is not affected by the fluctuation in rotation of the engine. For example, if the engine is used for driving a cutter of a lawn mower and the motor is used for traveling of the lawn mower main body, the lawn mower can be driven at a constant speed regardless of the fluctuation in engine load.

According to the eighth feature of the present invention, the synchronous standard formed based on the output of the auxiliary winding can be used in a cycle after computation immediately. Therefore, the phase control can be carried out at a high precision. According to the ninth feature of the invention, a fluctuation in load can be met easily.

According to the tenth feature of the present invention, the auxiliary winding is separated from the main winding and therefore, it is capable of determining the synchronous standard without being affected by any load unlike the main winding.

According to the eleventh feature of the present invention, battery free hybrid type system can be achieved which is not affected by a fluctuation in rotation speed of the engine.

DESCRITPION OF THE PREFERRED EMBDOIMENTS

Figure 2:
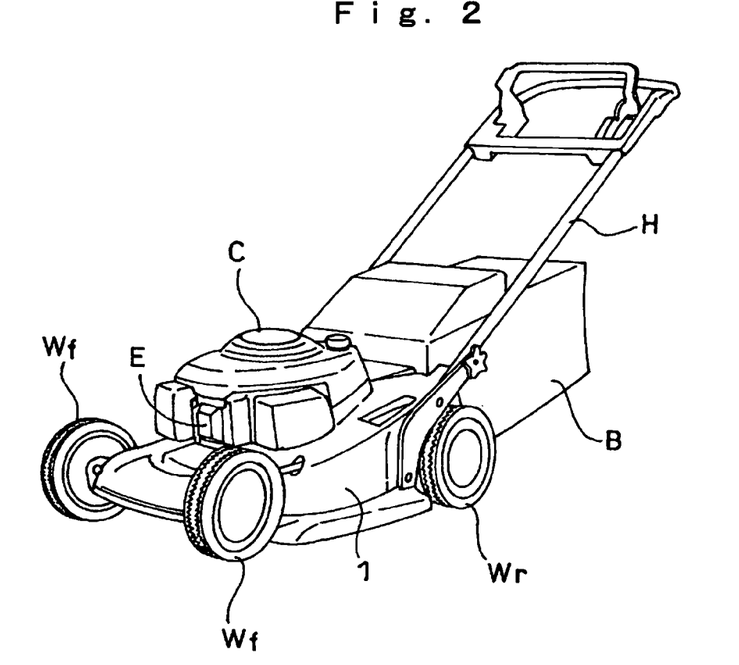
FIG. 2 is a perspective view of a lawn mower according to the embodiment of the present invention.
Figure 3:
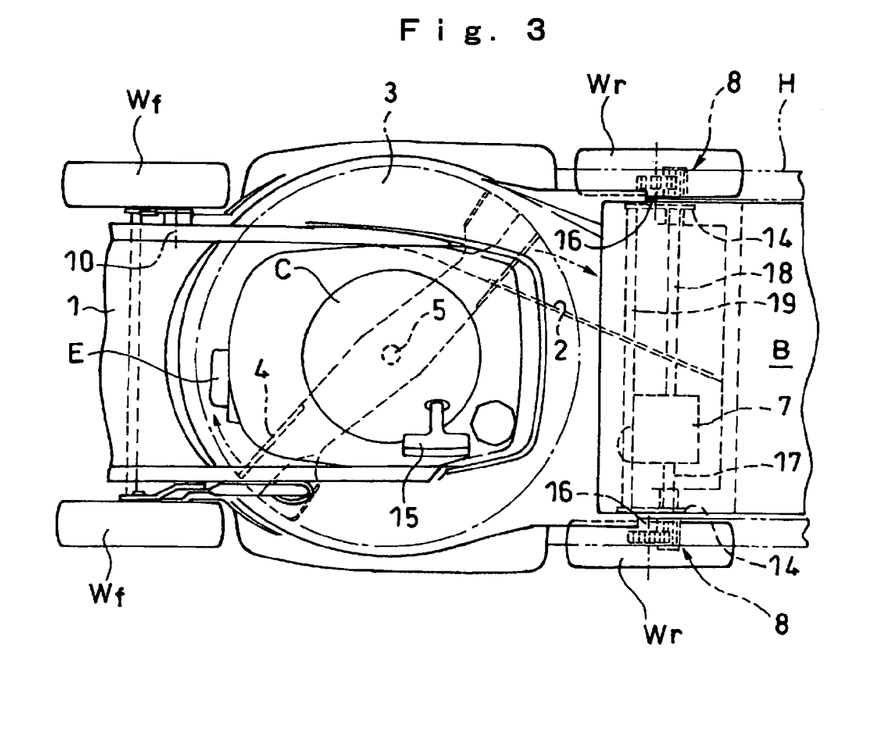
FIG. 3 is a plan view of major portions of the lawn mower according to the embodiment of the present invention.

A description will be in detail given below of an embodiment according to the present invention with reference to the accompanying drawings. FIG. 2 is a perspective view of an entire of a lawn mower corresponding to the hybrid type working machine according to an embodiment of the present invention, and FIG. 3 is a plan view of a main portion of the lawn mower. In FIG. 2, a pair of front wheels Wf and Wf is suspended to a front portion of a cutter housing 1 in the lawn mower, and a pair of rear wheels Wr and Wr is suspended to a rear portion of the cutter housing. A vertical type engine E in which an output shaft or a crankshaft is vertically provided is mounted in a center portion of the cutter housing 1, and an engine cover C is put on an upper protruding portion of the engine E. The engine E can be switched in multiple stages to, for example, 3000, 2500, and 2000 rpm and the engine E is controlled so that it may be maintained at each of these numbers of revolutions, through the use of a mechanical type governor. An operation handle H extending so as to rearward ascend toward a rear side is provided in both sides of a rear portion of the cutter housing 1, and a grass bag B for receiving mown lawn grasses is provided in the rear portion of the cutter housing 1.

In FIG. 3, a hollow cylindrical cutter chamber 3 that is open in a lower surface, that is, a ground surface side is formed in a center portion of the cutter housing 1, and a blade cutter (a working machine main body) 4 is received in the cutter chamber 3. The blade cutter 4 is connected with a crankshaft 5 of the engine E, and is driven by the engine so as to rotate within the cutter chamber 3.

A lawn grass discharging port 2 extending rearward from an outlet of the cutter chamber 3 and communicating with the grass bag B (refer to FIG. 2) is formed in a right side of the cutter housing 1 in a forward moving direction. The lawn grasses mowed by the blade cutter 4 are propelled by a blower (not shown) and collected in the grass bag B through the lawn grass discharging port 2.

Rear wheel supporting members 14, 14 are respectively arranged in both right and left sides of the rear portion of the cutter housing 1, and axles 16, 16 of the rear wheels Wr and Wr are suspended to the supporting members 14, 14. The right and left supporting members 14, 14 are connected to each other by a connecting shaft 19, and output shafts 17, 18 are provided in parallel to the connecting shaft 19. One ends of the output shafts 17 and 18 are connected to an electric motor 7, another ends of the output shafts 17 and 18 extend respectively to the supporting members 14, 14 and are connected to the axles 16, 16 of the rear wheels Wr and Wr via a reduction gear mechanism 8.

A recoil starter starting the engine E by using a starter rope is received within the engine cover C covering an upper portion of the engine E. A starter grip 15 connected with the starter rope (not shown) of the recoil starter is held in the engine cover C.

Figure 1:
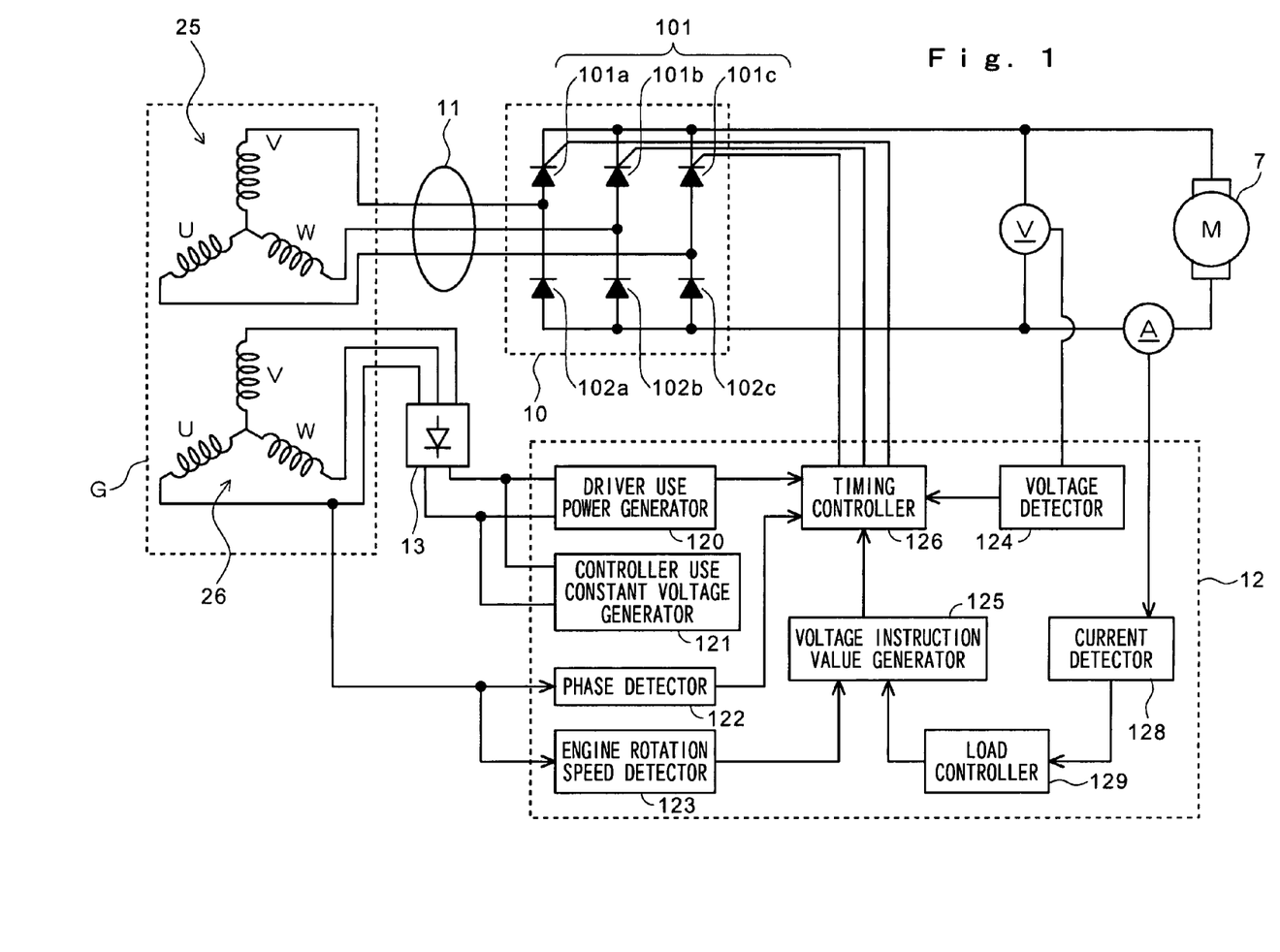
FIG. 1 is a diagram showing the structure of a drive unit of a working machine according to an embodiment of the present invention.

FIG. 1 is a block diagram showing the structure of the drive unit of the lawn mower. The generator G is, for example, an outer rotor type 3-phase AC generator having a magnet rotor and comprises the rotor coupled with the engine E and a stator corresponding to the rotor. The stator is constituted of main winding 25 and auxiliary winding 26. The three-phase output of the generator G to be picked out from the main winding 25 is connected to a DC converter 10 which is the output control circuit of a motor 7 through a power line 11. The DC converter 10 is a bridge circuit comprising thyristors 101a, 101b and 101c (hereinafter referred to as thyristor 101) and diodes 102a, 102b and 102c. The DC converter 10 controls the phase of an input AC power and supplies it to the motor 7. The motor 7 is a DC brushless motor.

The thyristor 101 is controlled in phase by the control unit 12 so that the rotation speed of the motor 7 converges at a target speed, thereby controlling the rotation speed of the motor 7. That is, the conductive angle of the thyristor 101 is controlled so as to control a conduction duration to control the rate of conduction within the waveform of an output AC of the generator G. The control power is formed of three-phase output of the auxiliary winding 26 of the generator G. The three-phase output line of the auxiliary winding 26 is connected to a full-wave rectifier 13 and its output is inputted to the control unit 12 as a control power supply.

The control unit 12 comprises a driver use power generator 120, a controller use constant voltage generator 121, a phase detector 122, an engine rotation speed detector 123, a voltage detector 124, a voltage instruction value generator 125 and a timing controller 126.

The drive power generator 120 generates a power for driving the thyristor 101. The controller use constant voltage generator 121 generates a constant voltage as a power for driving each portion of the control unit 12. The phase detector 122 monitors the waveform of a phase of the auxiliary winding 26 to detect the phase of the output waveform of the generator G. The phase of a detected output is used for computation of the synchronous standard, which will be described later. The engine rotation speed detector 123 detects the rotation cycle of the generator G, that is, the rotation speed of the engine E which drives the generator G by using the fact that the waveform of a single phase of the auxiliary winding 26 appears by predetermined times (for example, seven times for a 21-pole type) per a rotation of the generator G.

The voltage detector 124 detects a voltage applied from the DC converter 10 to the motor 7. The applied voltage on the motor 7 represents the rotation speed of the motor 7. The voltage instruction value generator 125 determines a voltage instruction value (that is, target speed value), which is a reference value of the applied voltage for adjusting the rotation speed (that is, speed of lawn mower) of the motor to a desired value. The voltage instruction value is determined corresponding to a speed instruction value instructed by a lawn mower operator using, for example, a variable resistor with an operation knob. The voltage instruction value generator 125 may compute a voltage instruction value using a predetermined equation when the speed instruction value is inputted therein or may be a memory which outputs a voltage instruction value when the speed instruction value is inputted as a memory address.

The timing controller 126 compares an applied voltage of the motor 7 detected by the voltage detector 124 with a voltage instruction value determined by the voltage instruction value generator 125 and according to the comparison result, the conduction start phase of the thyristor 101 is determined. The conduction to the thyristor 101 is started at a conduction start phase determined by the timing controller 126 and the thyristor 101 is controlled in its switching timing according to a desired phase angle. That is, the thyristor 101 is so driven that if the applied voltage to the motor 7 is higher than the voltage instruction value which is a target voltage value, the conduction angle is decreased and if the applied voltage is lower than the voltage instruction value, the conduction angle is increased, thereby eliminating a difference of the applied voltage to the voltage instruction value.

The switching control of the thyristor is synchronized based on the phase of the output waveform of the generator G, that is, the phase detected by the phase detector 122. For this synchronous control, a counter for computation the cycle of the output waveform of the auxiliary winding 26 is provided and when a time set up based on that counted value elapses, a drive signal synchronous with each phase is outputted. The detail of the synchronous control will be described with reference to FIG. 5.

Further, because even if the engine rotation speed fluctuates, the engine can be made to follow up without any delay based on a synchronous signal computed on the period of a cycle one time before, that is, a cycle just before, the rotation speed of the motor 7 can be maintained stably at a desired value. The rotation speed of the engine is fed back to the voltage instruction value generator 125 and when the rotation speed drops, it determines that the load on engine is excessive and reduces the amount of supplied power to the motor 7 so as to lower the rotation speed. In the lawn mower of this embodiment, by reducing the traveling speed, the amount of lawn cut by a blade driven by the engine decreases to lower the load on engine. A current detector 128 and a load controller 129 are provided to detect a current supplied to the motor 7. Detecting a load condition depending on the magnitude of the current supplied to the motor 7, the load controller 129 determines a compensation value corresponding to the magnitude of the load, namely, the value of supplied current so as to maintain a motor rotation speed to this load and supplied to the voltage instruction value generator 125. For example, if the lawn mower travels on a ascent slope, the load condition on the motor 7 increases and therefore, the current supplied to the motor 7 is increased so as to obtain a motor output fitting to the load.

Figure 4:
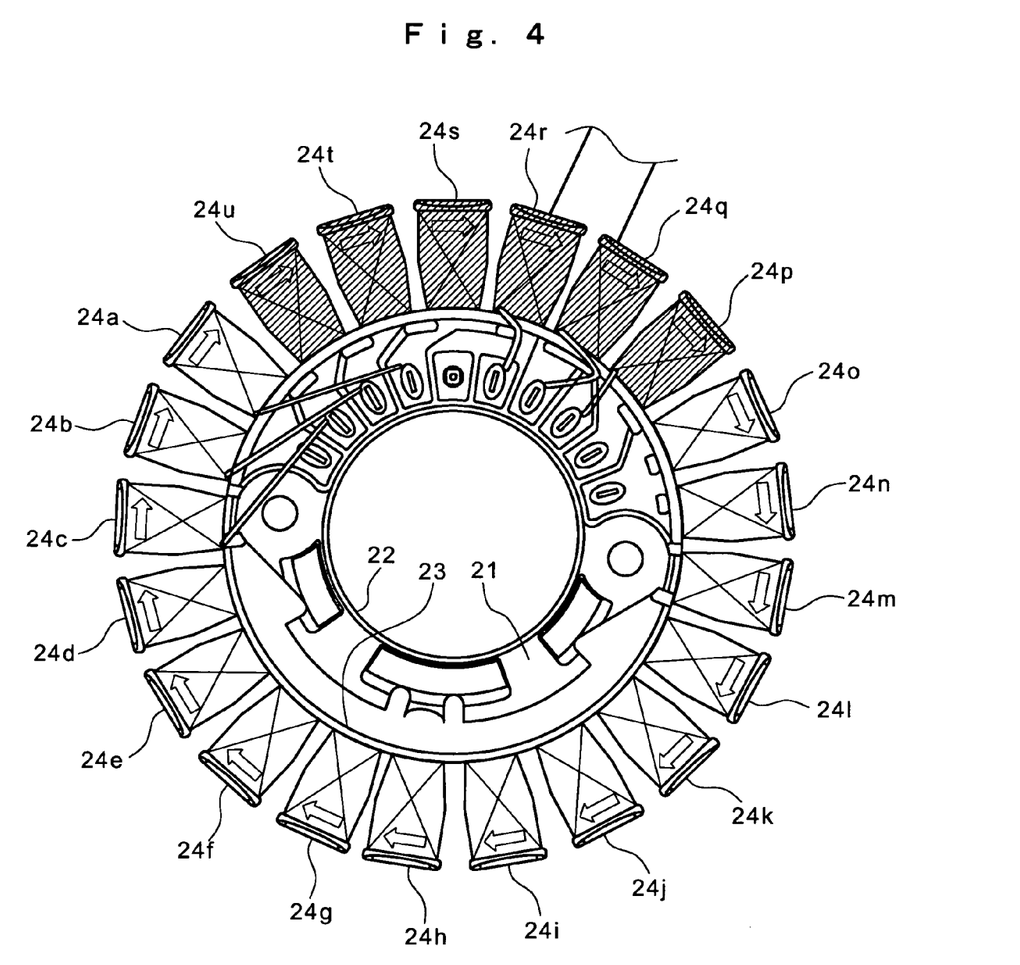
FIG. 4 is a front view showing the structure of the stator of the generator.

FIG. 4 is a front view showing the stator of the generator G. In this Figure, a core 21 of the stator is constituted of plural core plates stacked and includes a core base portion 23 formed into a disc shape provided with a fitting hole 22 for installing on a machine, in the center. Twenty one of radiantly projecting poles 24a-24u are formed on the outer periphery of the core base portion 23. Of the projecting poles 24a-24o have the main winding 25 while the projecting poles 24p-24u have the auxiliary winding 26 for control power supply. The main winding 25 serves to output a motor power of three phases, U phase, V phase and W phase and five windings are gathered as a group for each phase. The auxiliary winding 26 serves to output a power for control power supply of three phase, U phase, v phase and W phase and two windings are gathered as a group for each phase.

Figure 5:
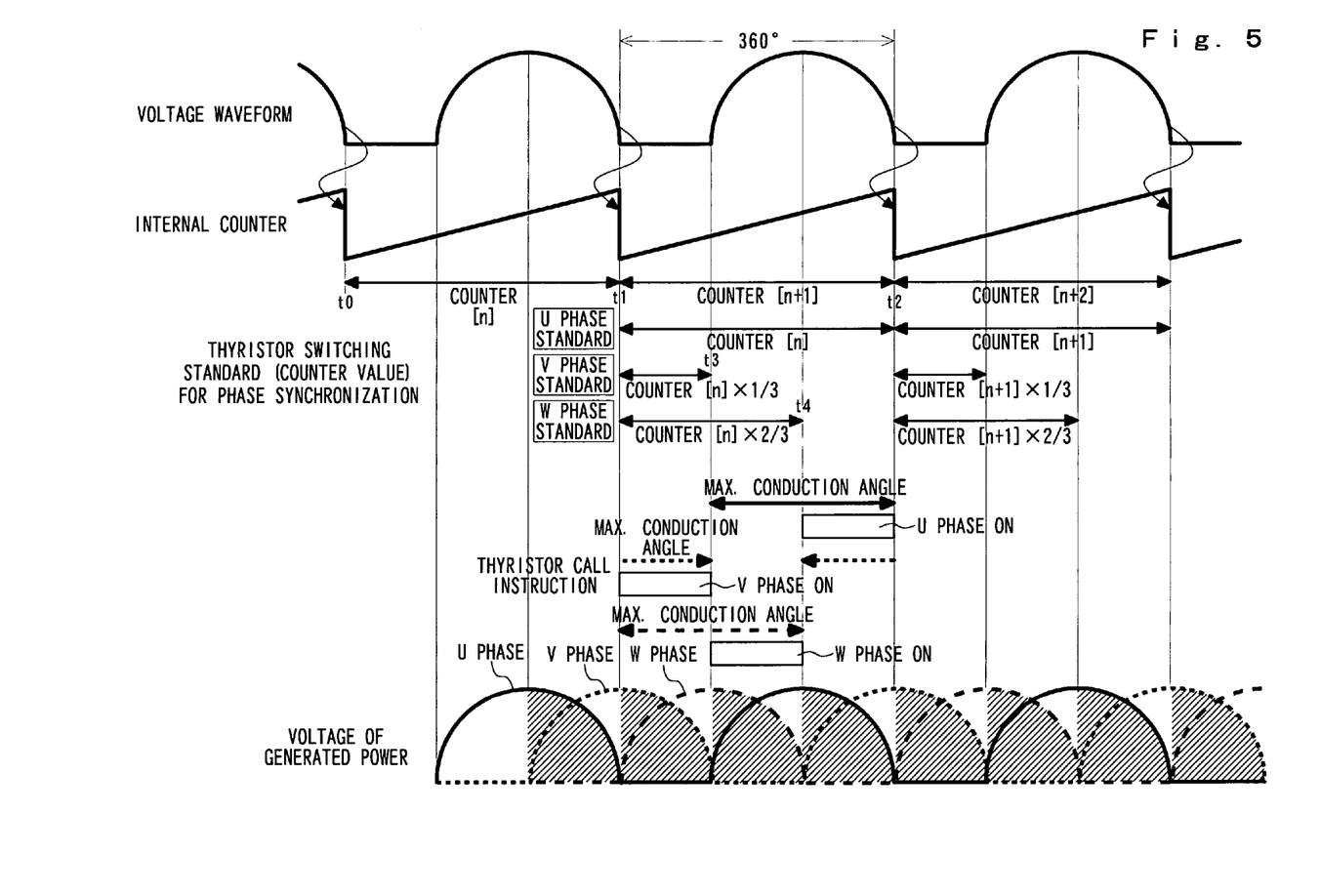
FIG. 5 is a timing chart of switching control based on three-phase control power source voltage.

FIG. 5 is a timing chart for switching control of the DC converter 10. The waveform expressed in the upper portion of FIG. 5 shows the voltage waveform of a single phase (U phase here) of the generator output for forming the synchronous standard. This waveform (hereinafter referred to as standard voltage waveform) is detected by the phase detector 122 based on the output of the auxiliary winding 26. In the middle of this FIG. 5, a diagram about the state of an internal counter which counts a cycle of the reference voltage waveform is shown and at the same time, a count value for forming the synchronous standard of each phase is shown. The waveform on the bottom of the FIG. 5 shows the waveform of the output, that is, generated voltage of the converter 10. Each waveform in FIG. 5 is expressed as a model, that is, in a simplified form.

The counter is reset to zero when the reference voltage waveform falls down to zero. Then, at time t1 when the reference voltage waveform falls next, a counter value is memorized to count the cycle of the reference voltage waveform (hereinafter the counter value is referred to as counter value c). If the counter value c is memorized, the counter value is reset to zero for next counting. The counter value c memorized, that is, the cycle of the reference voltage waveform which is an output waveform of the auxiliary winding 26 corresponds to the cycle of alternating current outputted by the main winding 25. Thus, the output alternating current of each phase of the main winding 25 can be controlled in switching according to the synchronous standard formed based on this counter value C.

A time when the counter value C elapses since time t1, that is, time t2 is referred to as thyrister switch standard of U phase. The thyristor switching standard of V phase is based on a point of time when a time corresponding to ⅓ the counter value C elapses since the time t1. The thyristor switching standard of W phase is based on a point of time when a time corresponding to ⅔ the counter value C elapses since the time t1. According to these standards, the conduction angle is at a position of 0° and then, the conduction angle is changed in a range of −240° from this standard.

That is, when the conduction angle is maximized, in case of U phase, the thyristor is kept ON from a point of time when a time corresponding to ⅓ the counter value C elapses since the time t1 up to a point of time when a time corresponding to the counter value C elapses. For the V phase, the thyristor is kept ON until a time corresponding to ⅓ the counter value C elapses since the time t1 and from a point of time when a time corresponding to ⅔ the counter value C elapses since the time t1 up to a point of time when a time corresponding to the counter value C elapses. For the W phase, the thyristor is kept ON until a time corresponding to ⅔ the counter value C elapses since the time t1.

The waveform on the bottom portion of FIG. 5 shows an example of the conduction angle, that is, the ON time of each phase of the thyristor 101 with hatched ranges. An example that the conduction angle is 120°, that is, the rate of conduction to the maximum conduction angle of the thyristor is 50% is indicated here.

Although according to the above-described embodiment, the auxiliary winding 26 is 3-phase winding like the main winding 25, the auxiliary winding 26 may be constituted of single phase.

Figure 6:
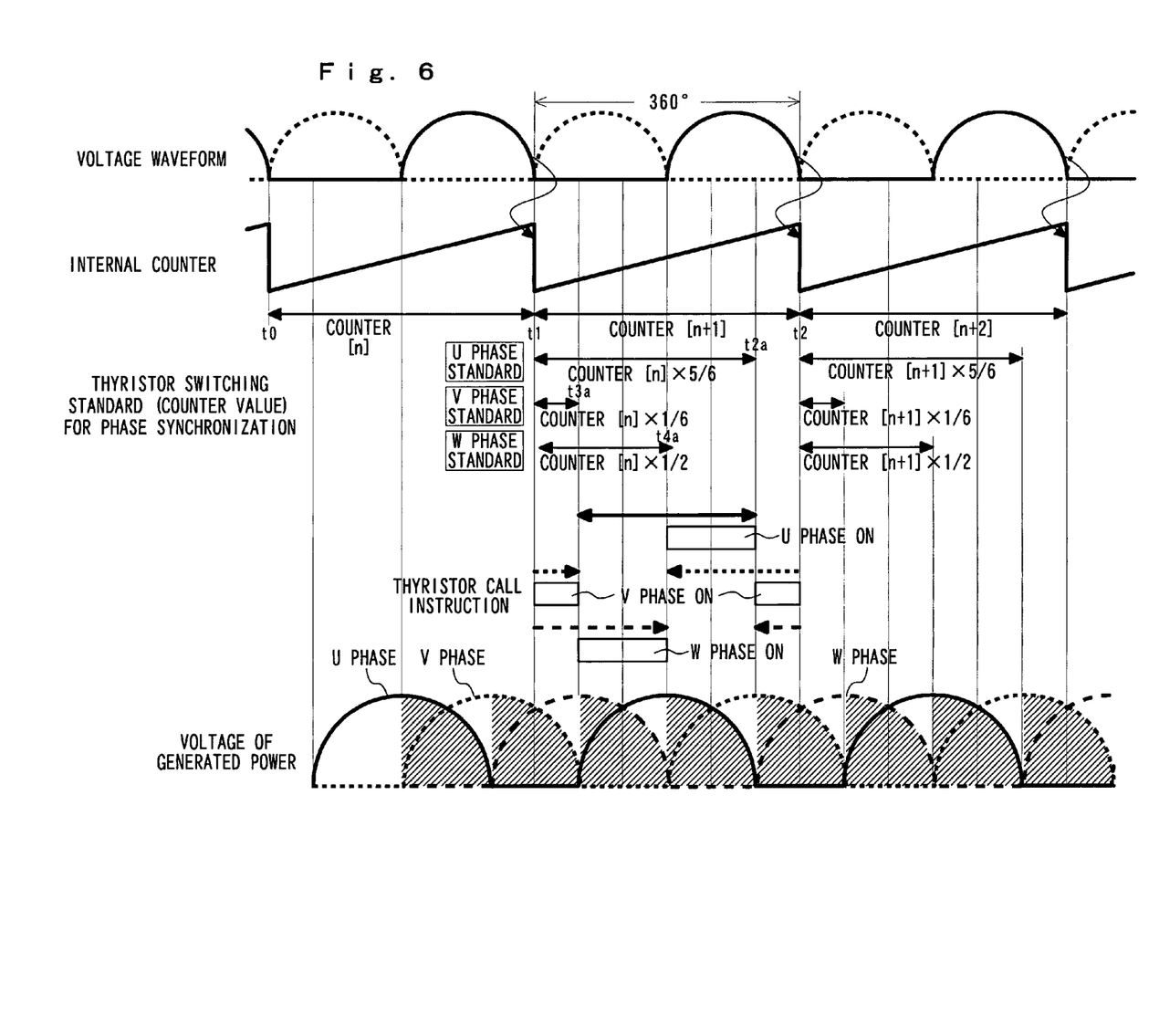
FIG. 6 is a timing chart of switching control based on three-phase control power source voltage, which is a diagram showing the relation between the current and voltage of the motor.

FIG. 6 is a timing chart of the switching control of the DC converter 10 based on the single phase control power supply voltage. The waveform on the upper portion of FIG. 6 indicates the reference voltage waveform picked out from the single phase. The middle portion of FIG. 6 indicates the state of an internal counter which counts a single cycle of reference voltage waveform. The waveform on the bottom portion of FIG. 6 indicates the waveform of the output of the converter 10, that is, the waveform of its generated voltage. Each waveform in FIG. 6 is expressed as a model, that is, in a simplified form.

Although the operation of FIG. 6 is the same as that described about FIG. 5, it is different in that the output of the three-phase main winding 25 is controlled based on the single phase reference voltage waveform. Therefore, the synchronous standards based on the counter value C are set up at positions t2a, t3a, t4a that are deflecting by 60° for each phase from time t2, t3, t4 following a difference of each phase in the single phase and three phases.

For example, a point of time t2a when the counter value C elapses since the time t1, that is, a point of time deflecting by 60° in a minus direction from the time t2 is regarded as thyristor switching standard for U phase. The thyristor switching standard for V phase is based on a point of time t3a when a time corresponding to ⅙ the counter value C elapses since the time t1. Further, the thyristor switching standard for W phase is based on a point of time t4a when a time corresponding to ½ the counter value C elapses since the time t1. These standards are positions in which the conduction angle is 0° and changing the conduction angle in a range of −240° max. in a direction is the same as the case for three phases.

According to the above-described embodiment, the load condition of the motor 7 is detected according to the magnitude of a current supplied to the motor 7 and a compensated output is obtained depending on the load condition. However, the present invention is not restricted to this embodiment and the compensation corresponding to the load condition may be omitted.

What is claimed is:

1. A hybrid type drive apparatus, comprising:
a magnet rotor type AC generator driven by an engine;
a motor driven by power supplied from the AC generator;
an output control unit for controlling the quantity of power supplied to said motor from said AC generator;
a switching circuit for switching each phase output of the generator;
wherein the output control unit includes;
a synchronous reference computing means for computing a synchronous standard, synchronous with each phase output of the generator based on the variation of the output frequency of the generator;
a speed detecting means for detecting the rotation speed of the motor; and
a speed target value computing means for determining a speed target value of the motor based on a difference between a predetermined target value and a rotation speed detected by the speed detecting means;
a conduction angle computing means for determining a conduction angle of switching elements formed of the switching circuit for controlling the rotation speed detected by the speed detecting means to the speed target value determined by the speed target value computing means; and
a means for switching an output of each phase of the generator by driving the switching elements of the switching circuit by the conduction angle according to the synchronous standard.

2. The hybrid type drive apparatus according to claim 1 wherein the speed detecting means is a detecting means for an applied voltage representing the rotation speed of the motor and the output control unit decreases the conduction angle when the applied voltage is higher than a voltage instruction value corresponding to the speed target value and increases the conduction angle when lower than the voltage instruction value.

3. The hybrid type drive apparatus according to claim 2 further comprising a load detecting means for detecting the load condition of the motor and a means for compensating the conduction angle corresponding to a detected load condition.

4. The hybrid type drive apparatus according to claim 1 wherein the generator has a main winding for supplying power to the motor and an auxiliary winding provided separately from the main winding as output lines thereof and the synchronous reference computing means computes the synchronous standard based on an output from the auxiliary winding.

5. The hybrid type drive apparatus according to claim 4 wherein the synchronous standard is used as a control standard for phase control to an output waveform of the main winding outputted from the switching in a cycle next after the computation of the synchronous standard.

6. The hybrid type drive apparatus according to claim 1 which is applied to a working machine driven by the engine and the motor which uses the engine as a drive source.

7. The hybrid type drive apparatus according to claim 1 wherein the generator has a main winding and an auxiliary winding placed separately from the main winding and the synchronous standard computing means is so constructed to determine a synchronous standard for each cycle of the output cycle of the auxiliary winding, and the switching control of the switching circuit is executed based on a conduction angle determined corresponding to the difference so as to eliminate a difference between the output voltage of the output control means and a predetermined target voltage.

8. The hybrid type drive apparatus according to claim 1 wherein said synchronous standard is used for the standard of the switching control of the switching circuit of a corresponding AC output wave outputted from the switching circuit in a cycle just after the synchronous standard is determined.

9. The hybrid type drive apparatus according to claim 7 further comprising a current detecting means for detecting an output load current of the switching circuit and a load control means for compensating the conduction angle corresponding to the magnitude of the load current.

10. The hybrid type drive apparatus according to claim 7 further comprising a drive power source generating means for generating a control power for driving the switching circuit with an output of the auxiliary winding.

11. The hybrid type drive apparatus according to claim 7 constructed as a battery free hybrid type power source so that output of the generator which is switching controlled by the switching circuit is supplied directly to the motor.

* * * * *